(12) United States Patent
Uno et al.

(10) Patent No.: US 12,319,153 B2
(45) Date of Patent: Jun. 3, 2025

(54) ELECTRIFIED VEHICLE

(71) Applicant: TOYOTA JIDOSHA KABUSHIKI KAISHA, Toyota (JP)

(72) Inventors: Yoshiyuki Uno, Toyota (JP); Kenji Murasato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/132,676

(22) Filed: Apr. 10, 2023

(65) Prior Publication Data

US 2023/0391198 A1     Dec. 7, 2023

(30) Foreign Application Priority Data

Jun. 3, 2022   (JP) ................................. 2022-090895

(51) Int. Cl.
   *B60L 3/00*   (2019.01)
(52) U.S. Cl.
   CPC ........... *B60L 3/0069* (2013.01); *B60L 3/0038* (2013.01); *B60L 2210/10* (2013.01)
(58) Field of Classification Search
   CPC .................................................. B60L 3/0069
   See application file for complete search history.

(56) References Cited

U.S. PATENT DOCUMENTS

| | | | |
|---|---|---|---|
| 10,232,735 B2 | 3/2019 | Koketsu et al. | |
| 2009/0108674 A1 | 4/2009 | Ozaki et al. | |
| 2012/0109442 A1 | 5/2012 | Kato et al. | |
| 2014/0028256 A1 | 1/2014 | Sugiyama | |
| 2016/0144725 A1* | 5/2016 | Nozawa | B60L 15/007 307/10.1 |
| 2016/0185241 A1* | 6/2016 | Kinomura | B60L 53/60 180/65.245 |
| 2021/0078422 A1 | 3/2021 | Lee et al. | |
| 2021/0249959 A1 | 8/2021 | Funato et al. | |
| 2022/0089049 A1 | 3/2022 | Ando | |

FOREIGN PATENT DOCUMENTS

| | | |
|---|---|---|
| JP | 2007-295699 A | 11/2007 |
| JP | 2011-160604 A | 8/2011 |
| JP | 2013-240191 A | 11/2013 |
| JP | 5497381 B2 | 5/2014 |
| JP | 2021-129360 A | 9/2021 |
| JP | 2022-051102 A | 3/2022 |
| WO | 2010/143281 A1 | 12/2010 |
| WO | 2012/144045 A1 | 10/2012 |
| WO | 2015/002088 A1 | 1/2015 |

* cited by examiner

*Primary Examiner* — Daniel Kessie
(74) *Attorney, Agent, or Firm* — Dinsmore & Shohl LLP

(57) ABSTRACT

An electrified vehicle includes: a power storage device; an electric motor configured to drive a drive wheel; a drive device configured to drive the electric motor by using electric power in the power storage device; relays configured to connect or disconnect the power storage device and the drive device; a converter connected to power lines between the relays and the drive device; and a control device configured to activate the converter or stop the converter when a voltage is applied to the power lines to which the converter is connected.

4 Claims, 8 Drawing Sheets

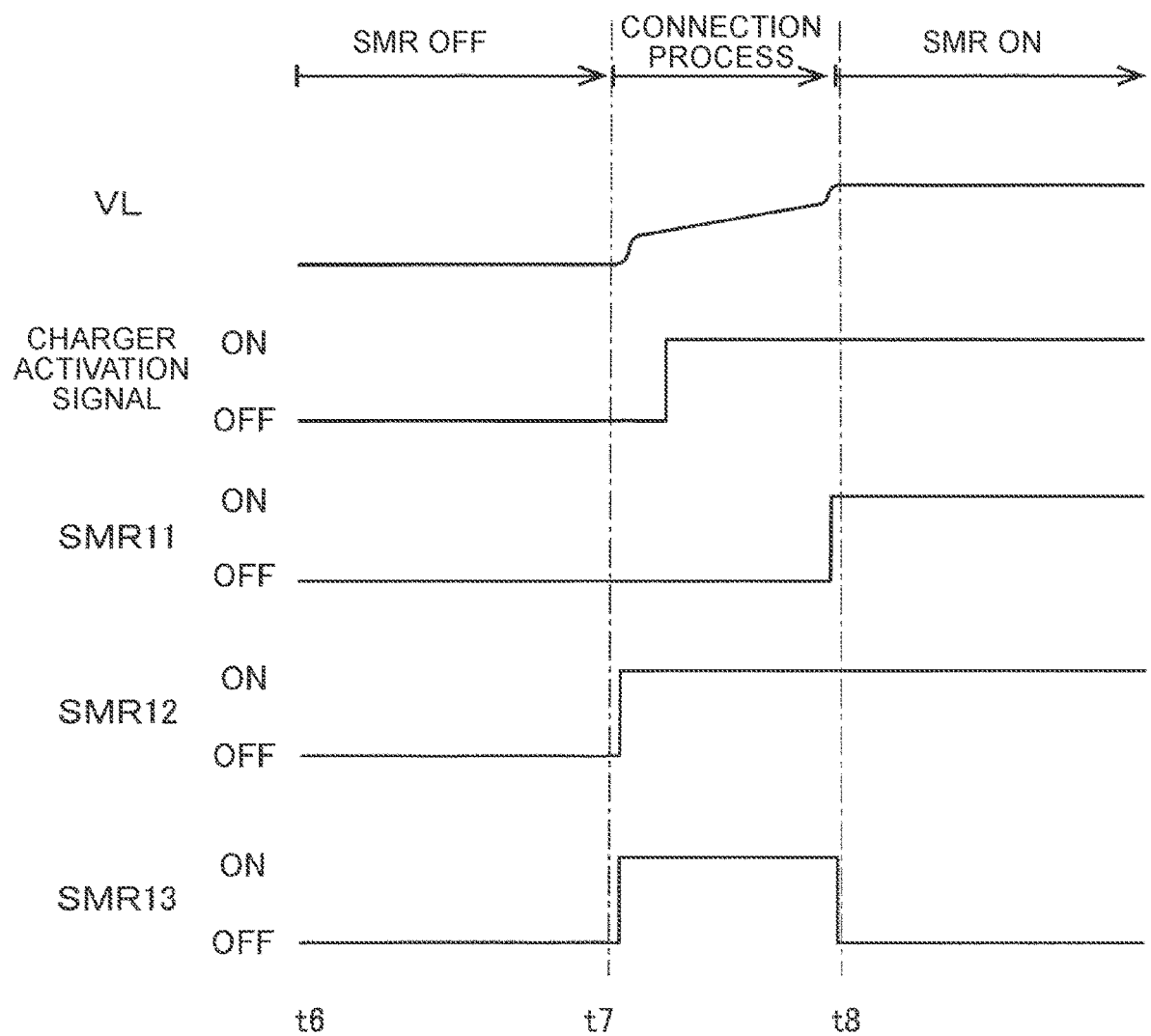

ELECTRIFIED VEHICLE

CROSS-REFERENCE TO RELATED APPLICATION

This application claims priority to Japanese Patent Application No. 2022-090895 filed on Jun. 3, 2022, incorporated herein by reference in its entirety.

BACKGROUND

1. Technical Field

The present disclosure relates to an electrified vehicle.

2. Description of Related Art

For example, an electrified vehicle described in Japanese Unexamined Patent Application Publication No. 2013-240191 (JP 2013-240191 A) includes a power conversion device that outputs electric power input from an inlet to a power storage device and outputs electric power input from the power storage device to an outlet. In JP 2013-240191 A, system main relays (SMRs) that connect the power storage device and a power control unit (PCU) are provided and the power conversion device is connected to power lines between the SMRs and the PCU. The PCU is a drive device that includes an inverter and drives a motor generator by using electric power from the power storage device.

SUMMARY

In the electrified vehicle disclosed in JP 2013-240191 A, when the power conversion device (hereinafter also referred to as "converter") is activated while the SMRs are disconnected and the electric power in the power storage device is not supplied to the PCU, a voltage may be generated in an electric circuit including the PCU due to a leak current in a driver (drive circuit) for switching elements constituting the converter. In a case where abnormality detection in the electric circuit, offset learning (zero-point correction) for various sensors, or the like is performed under the assumption that no voltage is generated in the electric circuit including the PCU because the SMRs are in the disconnected state, erroneous detection or erroneous learning may occur when the voltage is generated in the electric circuit due to the leak current in the driver for the switching elements.

An object of the present disclosure is to prevent a voltage from being generated in an electric circuit including a drive device due to a leak current in a converter when relays that connect or disconnect a power storage device and the drive device are disconnected.

An electrified vehicle of the present disclosure includes: a power storage device; an electric motor configured to drive a drive wheel; a drive device configured to drive the electric motor by using electric power in the power storage device; relays configured to connect or disconnect the power storage device and the drive device; a converter connected to power lines between the relays and the drive device and configured to convert alternating current power supplied from an external power supply into direct current power and charge the power storage device; and a control device configured to activate the converter or stop the converter when a voltage is applied to the power lines to which the converter is connected.

According to this configuration, the converter is connected to the power lines between the drive device and the relays that connect or disconnect the power storage device and the drive device. The converter converts the alternating current power supplied from the external power supply into the direct current power and charges the power storage device. The control device activates the converter when the voltage is applied to the power lines to which the converter is connected. Alternatively, the control device stops the converter when the voltage is applied to the power lines to which the converter is connected.

An electrified vehicle of the present disclosure includes: a power storage device; an electric motor configured to drive a drive wheel; a drive device configured to drive the electric motor by using electric power in the power storage device; relays configured to connect or disconnect the power storage device and the drive device; a converter connected to power lines between the relays and the drive device and configured to convert direct current power in the power storage device into alternating current power and output the alternating current power to an outlet; and a control device configured to activate the converter or stop the converter when a voltage is applied to the power lines to which the converter is connected.

According to this configuration, the converter is connected to the power lines between the drive device and the relays that connect or disconnect the power storage device and the drive device. The converter converts the direct current power in the power storage device into the alternating current power and outputs the alternating current power to the outlet. The control device activates the converter when the voltage is applied to the power lines to which the converter is connected. Alternatively, the control device stops the converter when the voltage is applied to the power lines to which the converter is connected.

An electrified vehicle of the present disclosure includes: a power storage device; an electric motor configured to drive a drive wheel; a drive device configured to drive the electric motor by using electric power in the power storage device; relays configured to connect or disconnect the power storage device and the drive device; a converter connected to power lines between the relays and the drive device and configured to convert alternating current power supplied from an external power supply into direct current power and charge the power storage device and to convert direct current power in the power storage device into alternating current power and output the alternating current power to an outlet; and a control device configured to activate the converter or stop the converter when a voltage is applied to the power lines to which the converter is connected.

According to this configuration, the converter is connected to the power lines between the drive device and the relays that connect or disconnect the power storage device and the drive device. The converter is configured to convert the alternating current power supplied from the external power supply into the direct current power and charge the power storage device and to convert the direct current power in the power storage device into the alternating current power and output the alternating current power to the outlet. The control device activates the converter when the voltage is applied to the power lines to which the converter is connected. Alternatively, the control device stops the converter when the voltage is applied to the power lines to which the converter is connected.

In the above configurations, the converter is activated when the voltage is applied to the power lines to which the converter is connected (power lines between the relays and the drive device). Even if a leak current is generated from the converter due to the activation of the converter, the voltage is applied to the power lines to which the converter is connected. Therefore, it is possible to suppress an increase in the voltage on the power lines due to the leak current. Therefore, the converter is not activated when the relays that connect or disconnect the power storage device and the drive device are disconnected and no voltage is applied to the power lines. Thus, it is possible to reduce the occurrence of the case where the voltage is generated in the electric circuit including the drive device due to the leak current in the converter.

In the above configurations, the converter is stopped when the voltage is applied to the power lines to which the converter is connected. Therefore, when there is a possibility that a leak current is generated from the converter before the converter is stopped, that is, while the converter is activated, the voltage is applied to the power lines to which the converter is connected. Thus, even if the leak current is generated from the converter, it is possible to suppress the increase in the voltage on the power lines due to the leak current. Further, the converter is stopped when the relays that connect or disconnect the power storage device and the drive device are disconnected and no voltage is applied to the power lines. Thus, it is possible to reduce the occurrence of the case where the voltage is generated in the electric circuit including the drive device due to the leak current in the converter. Therefore, when the relays that connect or disconnect the power storage device and the drive device are disconnected, it is possible to reduce the occurrence of the case where the voltage is generated in the electric circuit including the drive device due to the leak current in the converter.

The electrified vehicle of the present disclosure may further include: an auxiliary battery configured to supply electric power to an auxiliary device; and a bidirectional direct current-to-direct current converter configured to transfer electric power between the auxiliary battery and the power lines. The control device may be configured to execute a connection process for switching each of the relays from a disconnected state to a connected state. The connection process may include a process of stepping up the electric power in the auxiliary battery by the bidirectional direct current-to-direct current converter to increase the voltage on the power lines and activating the converter, and a process of switching the relays from the disconnected state to the connected state after the voltage on the power lines has increased to a predetermined value.

According to this configuration, the control device executes the connection process for switching each of the relays from the disconnected state to the connected state. The connection process includes the processes of stepping up the electric power in the auxiliary battery by the bidirectional direct current-to-direct current converter to increase the voltage on the power lines and activating the converter, and switching the relays from the disconnected state to the connected state after the voltage on the power lines has increased to the predetermined value.

In the connection process, the electric power in the auxiliary battery is stepped up by the bidirectional direct current-to-direct current converter to increase the voltage on the power lines and the converter is activated. The relays are switched from the disconnected state to the connected state after the voltage on the power lines has increased to the predetermined value. When the relays that connect or disconnect the power storage device and the drive device are disconnected, the converter is in the stopped state, and the voltage is not generated on the power lines to which the converter is connected due to the leak current from the converter.

When the converter is not activated, the converter is in an unstable state, and malfunction may occur due to an unintended short circuit, noise, or the like. According to this configuration, the converter is activated when the relays are in the connected state and the voltage of the power storage device is applied to the power lines. Therefore, it is possible to suppress the short circuit or malfunction of the converter when the voltage is applied to the power lines to which the converter is connected (power lines between the relays and the drive device).

The electrified vehicle of the present disclosure may further include: an auxiliary battery configured to supply electric power to an auxiliary device; and a bidirectional direct current-to-direct current converter configured to transfer electric power between the auxiliary battery and the power lines. The control device may be configured to execute a disconnection process for switching each of the relays from a connected state to a disconnected state. The disconnection process may include a process of, after the relays have been switched from the connected state to the disconnected state, supplying the electric power on the power lines to the auxiliary battery by the bidirectional direct current-to-direct current converter to step down the voltage on the power lines and stopping the converter.

According to this configuration, the control device executes the disconnection process for switching each of the relays from the connected state to the disconnected state. The disconnection process includes the process of, after the relays have been switched from the connected state to the disconnected state, supplying the electric power on the power lines to the auxiliary battery by the bidirectional direct current-to-direct current converter to step down the voltage on the power lines and stopping the converter.

In the disconnection process, after the relays have been switched from the connected state to the disconnected state, the electric power on the power lines is supplied to the auxiliary battery by the bidirectional direct current-to-direct current converter to step down the voltage on the power lines and the converter is stopped. When the relays that connect or disconnect the power storage device and the drive device are disconnected, the converter is in the stopped state, and the voltage is not generated on the power lines to which the converter is connected due to the leak current from the converter. Further, the converter is activated when the relays are in the connected state and the voltage of the power storage device is applied to the power lines. Therefore, it is possible to suppress the short circuit or malfunction of the converter when the voltage is applied to the power lines.

In the electrified vehicle of the present disclosure, the relays may include a circuit including a first relay configured to connect or disconnect one pole of the power storage device and the drive device and a limiting resistor connected in series with the first relay, a second relay connected in parallel with the circuit, and a third relay configured to connect or disconnect another pole of the power storage device and the drive device. The control device may be configured to execute a connection process for switching each of the relays from a disconnected state to a connected state. The connection process may include a process of performing a precharging process for switching the first relay and the third relay from the disconnected state to the connected state and activating the converter, and a process of, after the precharging process has been finished, switching the second relay from the disconnected state to the connected state and switching the first relay to the disconnected state.

According to this configuration, in the connection process, the precharging process is performed to switch the first relay and the third relay from the disconnected state to the connected state. The control device activates the converter along with the precharging process. After the precharging process has been finished, the control device switches the second relay from the disconnected state to the connected state and switches the first relay to the disconnected state. Then, the control device terminates the connection process.

In the connection process, the voltage on the power lines to which the converter is connected (power lines between the relays and the drive device) is increased by the precharging process, and the converter is activated. After the precharging process has been finished, the second relay is switched from the disconnected state to the connected state and the first relay is switched to the disconnected state. Then, the connection process is terminated. When the relays that connect or disconnect the power storage device and the drive device are disconnected, the converter is in the stopped state, and the voltage is not generated on the power lines to which the converter is connected due to the leak current from the converter.

When the converter is not activated, the converter is in an unstable state, and malfunction may occur due to an unintended short circuit, noise, or the like. According to this configuration, the converter is activated when the relays are in the connected state and the voltage of the power storage device is applied to the power lines. Therefore, it is possible to suppress the short circuit or malfunction of the converter when the voltage is applied to the power lines.

In the electrified vehicle of the present disclosure, the control device may be configured to execute a disconnection process for switching each of the relays from a connected state to a disconnected state. The disconnection process may include a process of switching a relay configured to connect or disconnect one pole of the power storage device and the drive device from the connected state to the disconnected state and, after an elapse of a predetermined period, switching a relay configured to connect or disconnect another pole of the power storage device and the drive device from the connected state to the disconnected state, and a process of stopping the converter within the predetermined period.

According to this configuration, the control device executes the disconnection process for switching each of the relays from the connected state to the disconnected state. In the disconnection process, the relay configured to connect or disconnect one pole of the power storage device and the drive device is switched from the connected state to the disconnected state and, after the elapse of the predetermined period, the relay configured to connect or disconnect another pole of the power storage device and the drive device is switched from the connected state to the disconnected state. Then, the converter is stopped within the predetermined period in the disconnection process. When both the poles of the power storage device and the drive device are disconnected, the converter is in the stopped state, and the voltage is not generated on the power lines to which the converter is connected due to the leak current from the converter. Further, the converter is activated when the relays are in the connected state and the voltage of the power storage device is applied to the power lines. Therefore, it is possible to suppress the short circuit or malfunction of the converter when the voltage is applied to the power lines.

In the electrified vehicle of the present disclosure, the control device may be configured to, when all the relays configured to connect or disconnect the power storage device and the drive device are in a disconnected state, execute an abnormality detection process for the drive device or an offset correction process for sensors provided in an electric circuit including the drive device.

When all the relays configured to connect or disconnect the power storage device and the drive device are in the disconnected state and the abnormality detection process for the drive device or the offset correction process for the sensors provided in the electric circuit including the drive device is executed under the assumption that no voltage is generated in the electric circuit including the drive device, erroneous detection or erroneous correction may occur if a voltage is generated in the electric circuit due to the leak current in the converter.

According to this configuration, when the relays are in the disconnected state, the converter is in the stopped state and the voltage is not generated on the power lines to which the converter is connected due to the leak current from the converter. Even if the abnormality detection process or the offset correction process is executed under the assumption that no voltage is generated in the electric circuit including the drive device, the erroneous detection or the erroneous correction can be suppressed.

According to the present disclosure, it is possible to prevent the voltage from being generated in the electric circuit including the drive device due to the leak current in the converter when the relays that connect or disconnect the power storage device and the drive device are disconnected.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a time chart illustrating an SMR connection process in the first modification.

DETAILED DESCRIPTION OF EMBODIMENTS

Embodiments of the present disclosure will be described in detail below with reference to the drawings. The same or corresponding parts are denoted by the same signs throughout the drawings, and description thereof will not be repeated.

First Embodiment

Figure 1:
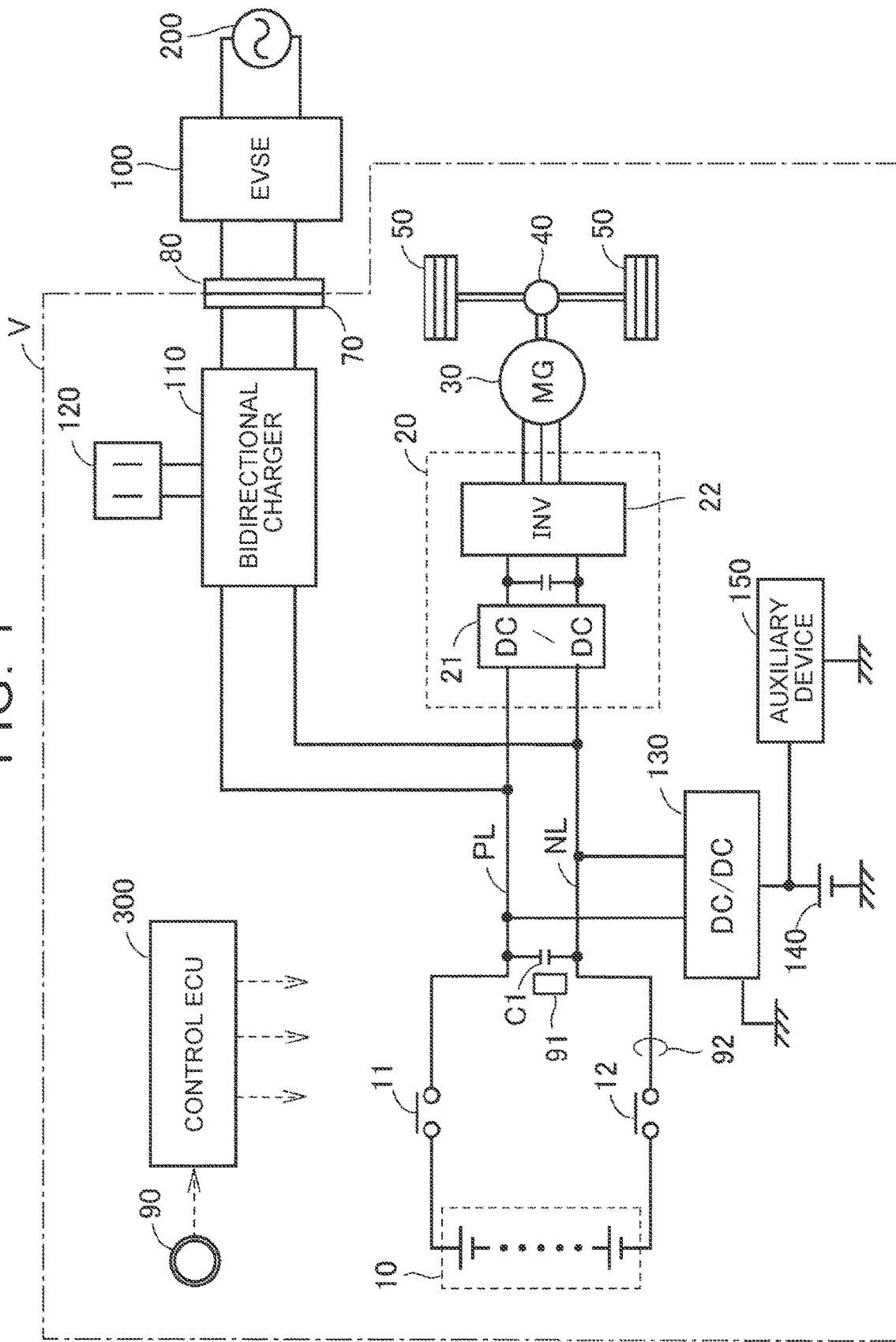
FIG. 1 is a diagram showing a configuration of an electrified vehicle according to an embodiment of the present disclosure.

FIG. 1 is a diagram showing a configuration of an electrified vehicle V according to a first embodiment of the present disclosure. Referring to FIG. 1, the electrified vehicle V includes a battery 10, a power control unit (hereinafter also referred to as "PCU") 20, a motor generator 30, a differential gear 40, and drive wheels 50.

The battery 10 is a power storage device, and is mounted on the electrified vehicle V as a drive power supply. The battery 10 includes a plurality of stacked single cells. The cell is a secondary battery such as a nickel metal hydride battery or a lithium ion battery. The cell may be a battery having a liquid electrolyte between a positive electrode and a negative electrode, or may be a battery having a solid electrolyte between a positive electrode and a negative electrode (solid-state battery).

The PCU 20 is a drive device that drives the motor generator 30 by using electric power stored in the battery 10. The battery 10 and the PCU 20 are connected by a power line PL and a power line NL. The positive electrode of the battery 10 and the power line PL are connected via a system main relay (SMR) 11. The negative electrode of the battery 10 and the power line NL are connected via a system main relay (SMR) 12. For example, the SMR 11 and the SMR 12 may be electromagnetic mechanical relays. When the SMR 11 and the SMR 12 are in a connected state, electric power can be transferred between the battery 10 and the PCU 20. When the SMR 11 and the SMR 12 are in a disconnected state, electric power cannot be transferred between the battery 10 and the PCU 20.

In the present embodiment, the PCU 20 includes a direct current-to-direct current (DC-DC) converter 21 and an inverter 22. The DC-DC converter 21 steps up a DC voltage of the battery 10 and supplies it to the inverter 22. The inverter 22 is a three-phase inverter that converts DC power supplied from the battery 10 into alternating current (AC) power to drive the motor generator 30. The inverter 22 converts AC power regenerated by the motor generator 30 into DC power, and supplies it to the battery 10 via the DC-DC converter 21. The DC-DC converter 21 may be omitted.

The motor generator 30 is an AC rotary electric machine and corresponds to an "electric motor" of the present disclosure. Examples of the motor generator 30 include a permanent magnet type synchronous motor including a rotor with embedded permanent magnets. An output shaft of the motor generator 30 is connected to the drive wheels 50 via the differential gear 40. The drive wheels 50 are driven by the motor generator 30.

The electrified vehicle V can charge the battery 10 by using an external power supply 200. The charging of the battery 10 by the external power supply 200 is also referred to as "external charging". The electrified vehicle V includes an inlet 70. The external charging is performed by connecting a connector 80 of charging equipment (electric vehicle supply equipment (EVSE)) 100 to the inlet 70. The EVSE 100 may be a charging cable with a control function or a general charger. The external power supply 200 may be, for example, an AC 200 V power supply.

A bidirectional charger 110 is connected to the power line PL (power line between the SMR 11 and the PCU 20) and the power line NL (power line between the SMR 12 and the PCU 20). The bidirectional charger 110 converts AC power supplied from the EVSE 100 via the inlet 70 into DC power and charges the battery 10. The bidirectional charger 110 also converts DC power of the battery 10 into AC power and outputs the AC power to an in-vehicle outlet 120. The bidirectional charger 110 corresponds to a "converter" of the present disclosure. The in-vehicle outlet 120 corresponds to an "outlet" of the present disclosure.

Figure 2:
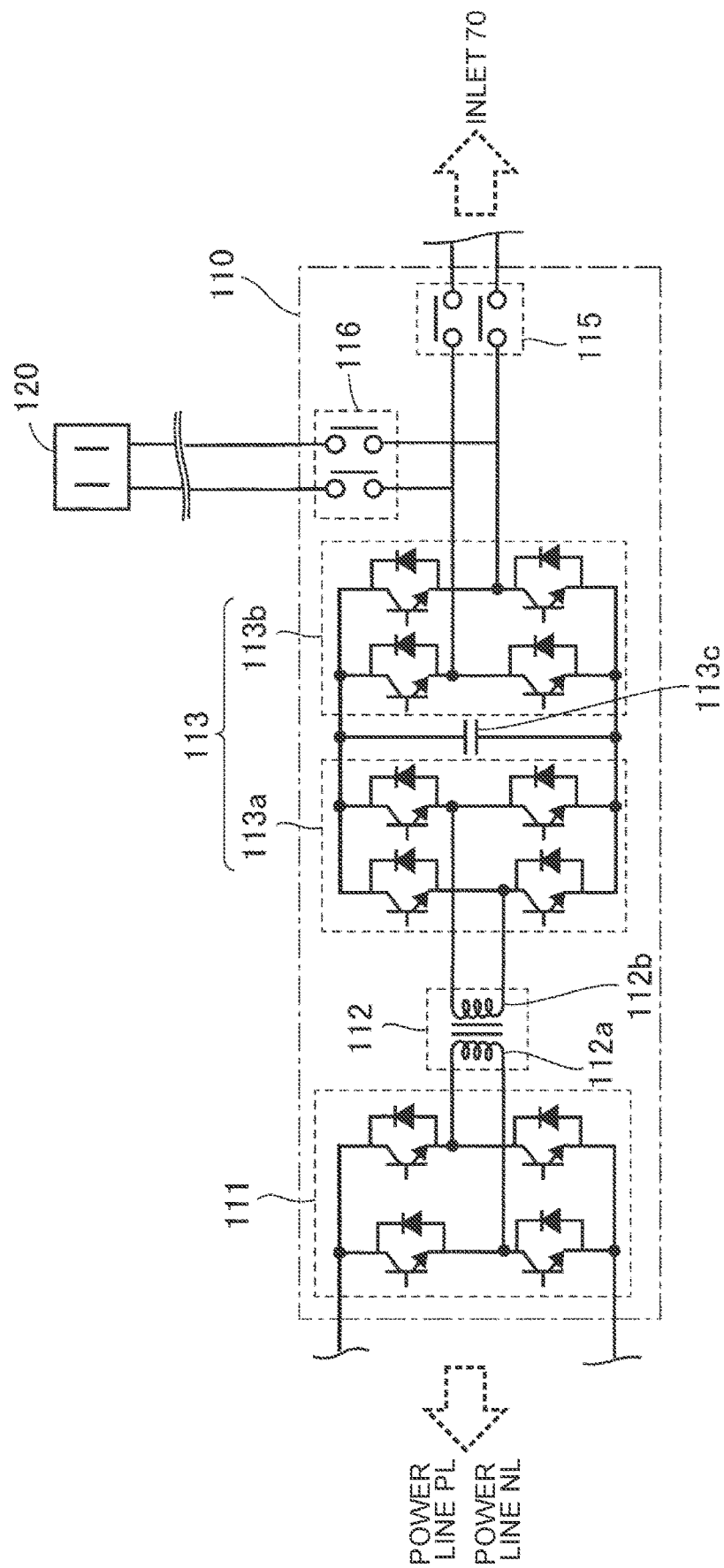
FIG. 2 is a diagram showing an example of a circuit configuration of a bidirectional charger.

FIG. 2 is a diagram showing an example of a circuit configuration of the bidirectional charger 110. The bidirectional charger 110 includes an inverter 111, an isolation circuit 112, and an inverter 113. The inverter 111 is a full-bridge circuit including four switching elements. The isolation circuit 112 is an isolation transformer including a first coil 112a and a second coil 112b. The isolation circuit 112 transforms a voltage at a ratio corresponding to a turns ratio between the first coil 112a and the second coil 112b. The inverter 113 includes a first inverter 113a, a second inverter 113b, and a smoothing capacitor 113c. Each of the first inverter 113a and the second inverter 113b is a full-bridge circuit including four switching elements. Each switching element in the inverters 111 and 113 is driven by a driver (drive circuit).

The inverter 111 is connected to the power line PL and the power line NL, and the midpoints of the second inverter 113b are connected to the inlet 70 via a relay 115. The midpoints of the second inverter 113b are also connected to the in-vehicle outlet 120 via a relay 116.

When charging the battery 10, the relay 115 is connected to the bidirectional charger 110. The second inverter 113b rectifies AC power input from the inlet 70 and outputs DC power to the first inverter 113a. The first inverter 113a converts the DC power received from the second inverter 113b into high-frequency AC power. The isolation circuit 112 transmits the output (AC power) from the first inverter 113a to the inverter 111. The inverter 111 rectifies the AC power received from the isolation circuit 112 and outputs DC power to the power lines PL and NL.

When outputting electric power to the in-vehicle outlet 120 (during power feeding), the relay 116 is connected to the bidirectional charger 110. The inverter 111 converts DC power input from the power lines PL and NL into high-frequency AC power and outputs it to the isolation circuit 112. The isolation circuit 112 transmits the output (AC power) from the inverter 111 to the first inverter 113a. The first inverter 113a rectifies the AC power received from the isolation circuit 112 and outputs DC power to the second inverter 113b. The second inverter 113b converts the DC power received from the first inverter 113a into predetermined AC power and outputs it to the in-vehicle outlet 120. The in-vehicle outlet 120 is an outlet provided in a vehicle cabin and having a rated voltage of, for example, AC 100 V.

Referring to FIG. 1 again, a voltage sensor 91 detects a voltage VL between the power line PL and the power line NL, and a current sensor 92 detects a current flowing through the power line PL and the power line NL. A smoothing capacitor C1 is provided between the power line PL and the power line NL to smooth the voltage VL.

A bidirectional DC-DC converter 130 is connected to the power line PL and the power line NL. The bidirectional DC-DC converter 130 steps down the voltage VL (voltage of the battery 10) and charges an auxiliary battery 140. The bidirectional DC-DC converter 130 steps up the voltage of the auxiliary battery 140 and supplies DC power to the power lines PL and NL. The auxiliary battery 140 is a power source for an auxiliary device 150.

A control electronic control unit (ECU) 300 controls the SMR 11, the SMR 12, the PCU 20, the bidirectional charger 110, the bidirectional DC-DC converter 130, and the like. The control ECU 300 includes a central processing unit (CPU), a memory, and an input/output port (none of which is shown). The memory includes a read only memory (ROM) and a random access memory (RAM), and stores, for example, programs to be executed by the CPU. The CPU executes a predetermined calculation process based on various signals input from the input/output port, signals from various sensors, and information stored in the memory to control each device such that the electrified vehicle V becomes a desired state based on the calculation result. The control ECU 300 corresponds to a "control device" of the present disclosure.

In the present embodiment, signals are input to the control ECU 300 from a power switch 90, the voltage sensor 91, the current sensor 92, and the like. The power switch is a switch for activating a vehicle system. When the power switch 90 is operated while the system is stopped, the vehicle system is activated and the electrified vehicle V can travel. When the power switch 90 is operated while the system is operating, the vehicle system is stopped and the electrified vehicle V cannot travel. The power switch 90 is also referred to as "ignition switch".

Figure 3:
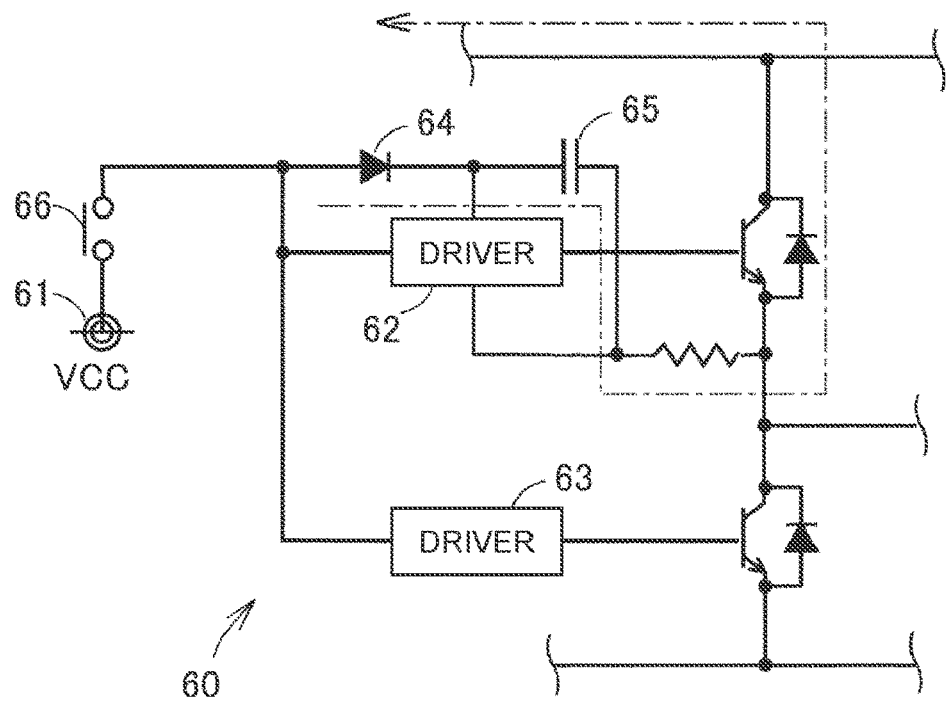
FIG. 3 is a diagram showing an example of a drive circuit for switching elements.

When the bidirectional charger 110 is activated, a voltage may be generated on the power lines PL and NL due to a leak current in the driver (drive circuit) for the switching elements of the inverter 111 constituting the bidirectional charger 110. FIG. 3 is a diagram showing an example of a drive circuit 60 for the switching elements. FIG. 3 shows one upper and lower arm circuit including an upper arm (high-side switching element) and a lower arm (low-side switching element) in the inverter 111. When the switching elements are used in the upper and lower arms in the full-bridge circuit or the like, power supplies of the upper arm (high-side switching element) and the lower arm (low-side switching element) need to be insulated from each other. In the present embodiment, a bootstrap circuit is used.

In FIG. 3, a positive voltage power supply 61 is connected to one end of a bootstrap capacitor 65 through a diode 64 via an activation switch 66. The other end of the bootstrap capacitor 65 is connected to an emitter of the high-side switching element via a resistor. The positive voltage power supply 61 is connected to a high-side gate driver 62 via the activation switch 66. The high-side gate driver 62 is connected to a gate of the high-side switching element. The positive voltage power supply 61 is connected to a low-side gate driver 63 via the activation switch 66. The low-side gate driver 63 is connected to a gate of the low-side switching element.

When the activation switch 66 of the drive circuit 60 is turned ON to operate the bidirectional charger 110, a current flows from the positive voltage power supply 61 along a path indicated by an arrow of a long dashed short dashed line in FIG. 3. Therefore, a leak current is generated. Due to this leak current, a voltage may be generated on the power lines PL and NL even when the SMR 11 and the SMR 12 are in the disconnected state. Thus, a voltage may be generated in the electric circuit including the PCU 20.

The present embodiment reduces the occurrence of a case where the voltage is generated in the electric circuit including the PCU 20 due to the leak current in the bidirectional charger 110 when the SMR 11 and the SMR 12 are disconnected.

Figure 4:
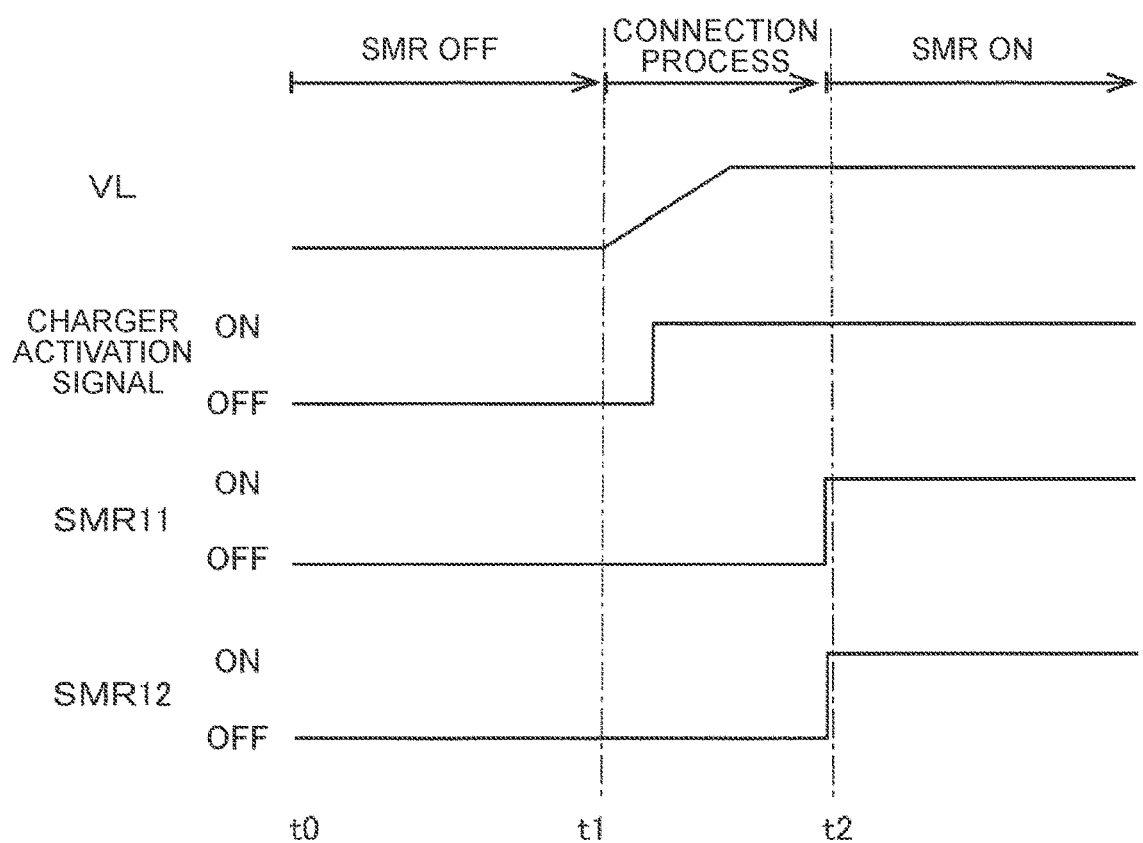
FIG. 4 is a time chart illustrating a system main relay (SMR) connection process of a first embodiment.

FIG. 4 is a time chart illustrating an SMR connection process of the present embodiment. At a time t0, the SMR 11 and the SMR 12 are in the disconnected state (OFF), and the battery 10 is not connected to the power lines PL and NL. Therefore, the voltage VL is 0 [V]. An activation signal for the bidirectional charger 110 is OFF, and the bidirectional charger 110 is in a stopped state.

When the power switch 90 is operated to activate the vehicle system or when the connector 80 of the EVSE 100 is connected to the inlet 70 to start charging the battery 10, the SMR connection process is started at a time t1. When the SMR connection process is started at the time t1, the bidirectional DC-DC converter 130 steps up the voltage of the auxiliary battery 140 and supplies DC power to the power lines PL and NL to increase the voltage VL (pre-charging). After a predetermined period has elapsed from time t1, the activation signal for the bidirectional charger 110 is turned from OFF to ON, and the activation switch 66 of the drive circuit 60 is turned ON (connected), thereby activating the bidirectional charger 110. The predetermined period is a period in which the voltage VL increases by the operation of the bidirectional DC-DC converter 130 and the voltage is securely applied between the power lines PL and NL. The predetermined period is preset by experiments or the like.

When the voltage VL increases approximately to the voltage of the battery 10 (battery voltage) by the operation of the bidirectional DC-DC converter 130, the SMR 11 and the SMR 12 are switched to the connected state at a time t2. The period from the time t1 to the time t2 is a period in which the voltage VL securely increases to the battery voltage by the operation of the bidirectional DC-DC converter 130. The period may be predetermined by experiments or the like.

Figure 5:
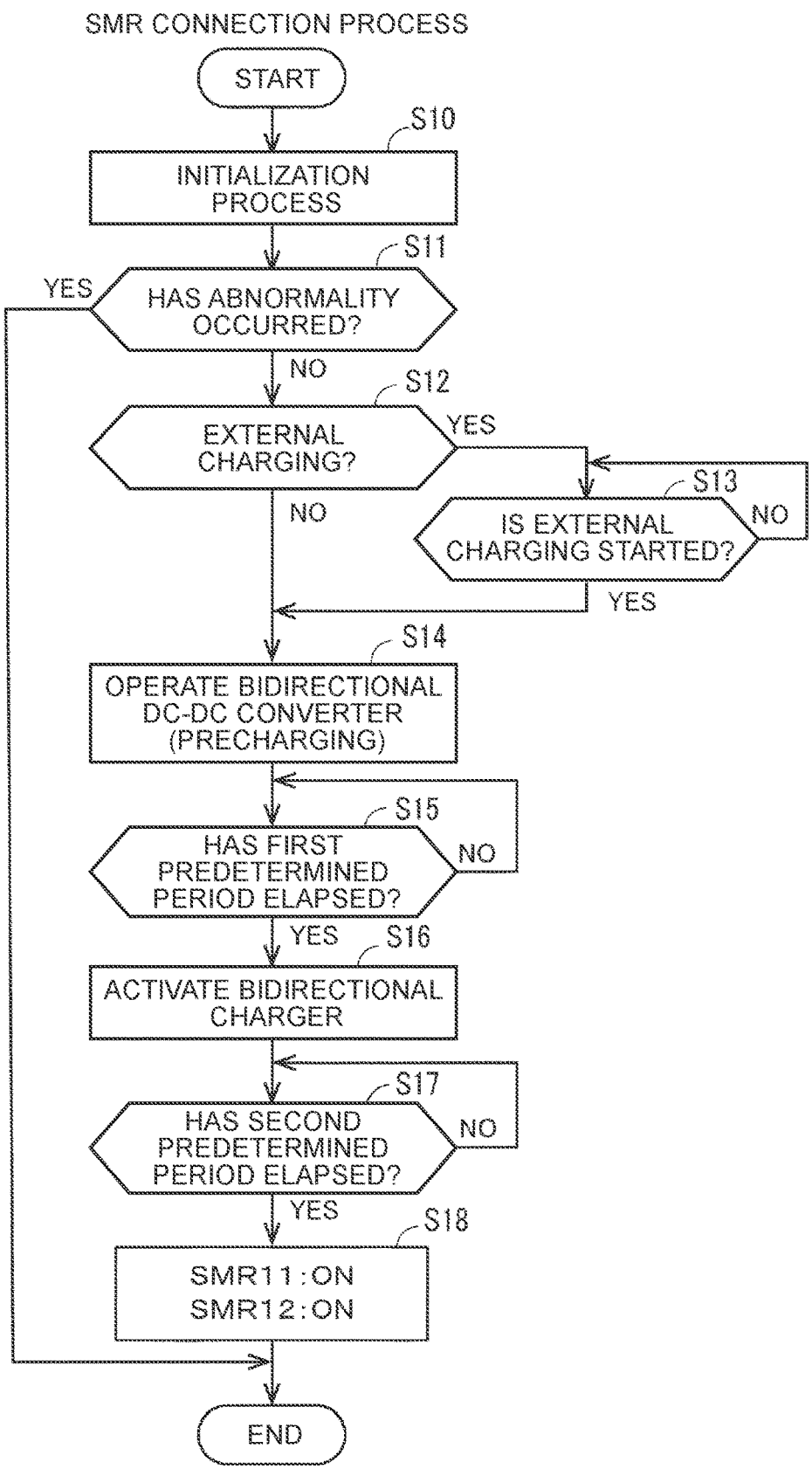
FIG. 5 is a flowchart showing an outline of the SMR connection process to be executed by a control electronic control unit (ECU)

FIG. 5 is a flowchart showing an outline of the SMR connection process to be executed by the control ECU 300. The process in this flowchart is started when the power switch 90 is operated to activate the vehicle system and when the connector 80 of the EVSE 100 is connected to the inlet 70. Before the SMR connection process is started, the SMR 11 and the SMR 12 are in the disconnected state (OFF), and the bidirectional charger 110 and the bidirectional DC-DC converter 130 are in the stopped state.

In Step (hereinafter abbreviated as "S") 10, an initialization process is executed. The initialization process includes a diagnosis process for determining whether an abnormality has occurred in the PCU 20, the bidirectional charger 110, the bidirectional DC-DC converter 130, or the like, and an offset correction process (offset value learning process) for the voltage sensor 91 and the current sensor 92. For example, the abnormality diagnosis for the PCU 20 is performed under the assumption that the voltage VL is 0 [V]. Further, the offset value (zero point) of the voltage sensor 91 is learned under the assumption that the voltage VL is 0 [V].

In S11, determination is made as to whether an abnormality has been diagnosed in the PCU 20, the bidirectional charger 110, or the like in the abnormality diagnosis of the initialization process. When an abnormality has occurred, positive determination is made and the current routine is terminated. In this case, a malfunction indicator lamp (MIL) may be turned ON to alert a user to the abnormality in the vehicle system. When no abnormality has occurred, negative determination is made and the process proceeds to S12.

In S12, determination is made as to whether the current process is the external charging. When the connector 80 is connected to the inlet 70, determination is made that the current process is the external charging (positive determination), and the process proceeds to S13. When the connector 80 is not connected to the inlet 70, negative determination is made and the process proceeds to S14.

In S13, determination is made as to whether the timing to start the external charging has come. For example, in a case where timer charging is set, determination is made that the timing to start the external charging has come at a charging start time. S13 is repeated until the timing to start the external charging comes. When the timing to start the external charging has come, positive determination is made and the process proceeds to S14.

In S14, the bidirectional DC-DC converter 130 is operated. The bidirectional DC-DC converter 130 steps up the voltage of the auxiliary battery 140 and supplies DC power to the power lines PL and NL to increase the voltage VL (precharging).

In S15, determination is made as to whether a first predetermined period has elapsed since the bidirectional DC-DC converter 130 was operated. The first predetermined period is a period in which the voltage VL increases by the operation of the bidirectional DC-DC converter 130 and the voltage is securely applied between the power lines PL and NL. S15 is repeated until the first predetermined period elapses. When the first predetermined period has elapsed, positive determination is made and the process proceeds to S16.

In S16, the bidirectional charger 110 is activated. The bidirectional charger 110 is activated by turning ON (connecting) the activation switch 66 of the drive circuit 60 of the bidirectional charger 110.

In S17, determination is made as to whether a second predetermined period has elapsed since the bidirectional DC-DC converter 130 was operated. The second predetermined period is a period in which the voltage VL securely increases to the battery voltage by the operation of the bidirectional DC-DC converter 130. S17 is repeated until the second predetermined period elapses. When the second predetermined period has elapsed, positive determination is made and the process proceeds to S18. In S17, determination may be made as to whether the voltage VL has increased to the battery voltage based on an output signal from the voltage sensor 91. When the voltage VL has increased to the battery voltage, positive determination may be made and the process may proceed to S18. The voltage VL after the elapse of the second predetermined period is not limited to the battery voltage. The voltage VL may increase by the operation of the bidirectional DC-DC converter 130 so that a large current does not flow through the contacts of the SMRs when the SMR 11 and the SMR 12 are connected.

In S18, the SMR 11 and the SMR 12 are switched to the connected state, and the current routine is terminated.

In the present embodiment, the bidirectional charger 110 is activated when a voltage is applied to the power lines PL and NL by the operation of the bidirectional DC-DC converter 130. As a result, it is possible to suppress the increase in the voltage on the power lines PL and NL due to the leak current from the bidirectional charger 110. Therefore, the bidirectional charger 110 is not activated when the SMR 11 and the SMR 12 that connect or disconnect the battery 10 and the PCU 20 are disconnected and no voltage is applied to the power lines PL and NL. Thus, it is possible to reduce the occurrence of the case where the voltage is generated in the electric circuit including the PCU 20 due to the leak current in the bidirectional charger 110.

When the bidirectional charger 110 is not activated, the bidirectional charger 110 is in an unstable state, and malfunction may occur due to an unintended short circuit, noise, or the like. According to the present embodiment, the bidirectional charger 110 is activated when the SMR 11 and the SMR 12 are in the connected state and the voltage of the battery 10 (battery voltage) is applied to the power lines PL and NL. Therefore, it is possible to suppress the short circuit or malfunction of the bidirectional charger 110 when a voltage is applied to the power lines PL and NL.

According to the present embodiment, the initialization process is performed in S10 in which the SMR 11 and the SMR 12 are in the disconnected state and the bidirectional charger 110 and the bidirectional DC-DC converter 130 are in the stopped state, thereby performing the abnormality diagnosis process for the PCU 20 and the like and the offset correction process for the voltage sensor 91 and the current sensor 92. Therefore, it is possible to suppress erroneous detection and erroneous correction even if the abnormality diagnosis process and the offset correction process are executed under the assumption that the voltage of the battery 10 and the voltage caused by the leak current in the bidirectional charger 110 are not applied to the power lines PL and NL and the voltage VL is 0 [V].

Second Embodiment

In the above embodiment (first embodiment), the generation of the voltage in the electric circuit including the PCU 20 due to the leak current in the bidirectional charger 110 when the SMR 11 and the SMR 12 are disconnected is suppressed in the SMR connection process. In a second embodiment, the generation of the voltage in the electric circuit including the PCU 20 due to the leak current in the bidirectional charger 110 is suppressed in an SMR disconnection process. The configuration of the electrified vehicle V is the same as that in the first embodiment.

Figure 6:
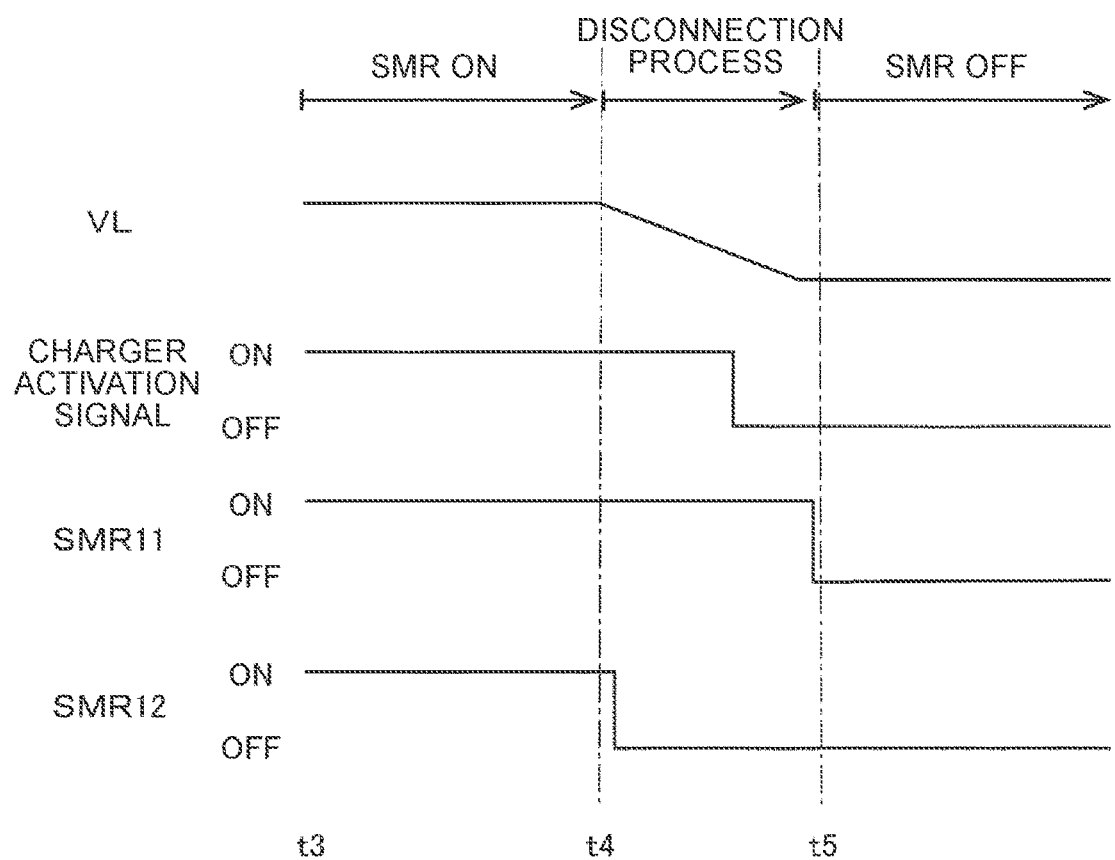
FIG. 6 is a time chart illustrating an SMR disconnection process of a second embodiment.

FIG. 6 is a time chart illustrating the SMR disconnection process of the second embodiment. At a time t3, the SMR 11 and the SMR 12 are in the connected state (ON), and the battery 10 is connected to the power lines PL and NL. Therefore, the voltage VL is the voltage of the battery 10 (battery voltage). The activation signal for the bidirectional charger 110 is ON, and the bidirectional charger 110 is in an activated state.

When the power switch 90 is operated to stop the vehicle system or when the external charging of the battery 10 is terminated, the SMR disconnection process is started at a time t4. When the SMR disconnection process is started at the time t4, the SMR 12 is switched to the disconnected state (OFF). At the time t4, the bidirectional DC-DC converter 130 steps down the voltage remaining between the power lines PL and NL and supplies it to the auxiliary battery 140. Thus, the voltage VL decreases over time. After a predetermined period has elapsed from the time t4, the activation signal for the bidirectional charger 110 is turned from ON to OFF, and the activation switch 66 of the drive circuit 60 is turned OFF (disconnected), thereby stopping the bidirectional charger 110. The predetermined period is a period in which the voltage VL decreases by the operation of the bidirectional DC-DC converter 130 so that the failure or breakage of each device does not occur even if malfunction occurs due to an unintended short circuit, noise, or the like because the bidirectional charger 110 is in an unstable state. The predetermined period is preset by experiments or the like.

When the voltage VL decreases approximately to 0 [V] by the operation of the bidirectional DC-DC converter 130, the SMR 11 is switched to the disconnected state (OFF) at a time t5. The period from the time t4 to the time t5 is a period in which the voltage VL reaches approximately 0 [V] by the operation of the bidirectional DC-DC converter 130. The period is predetermined by experiments or the like.

Figure 7:
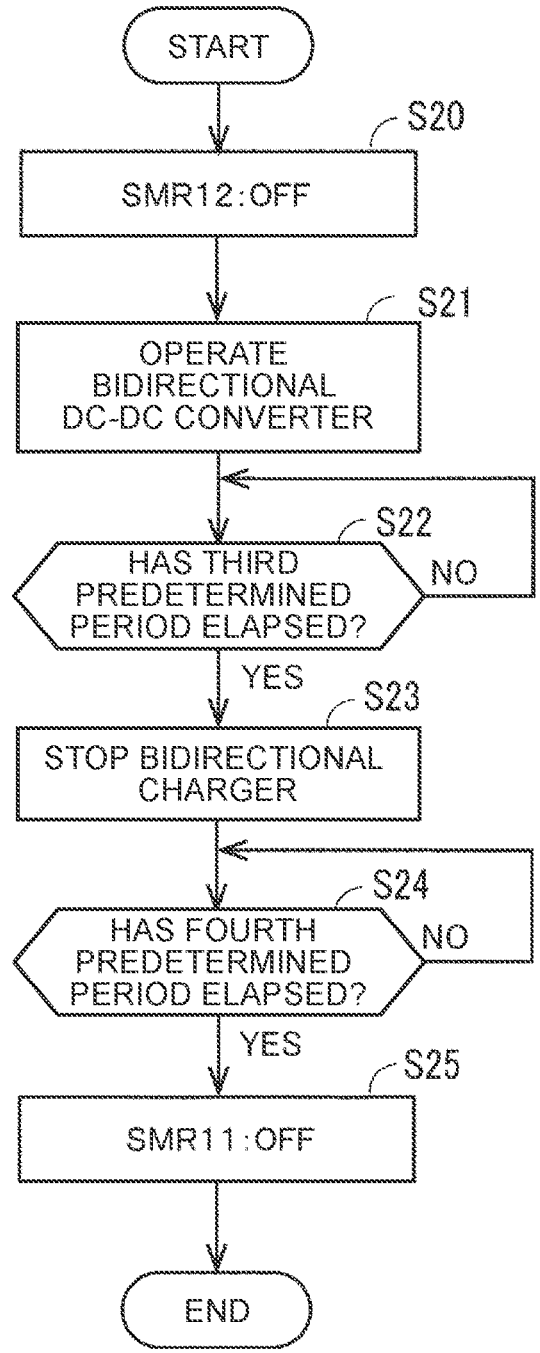
FIG. 7 is a flowchart showing an outline of the SMR disconnection process to be executed by the control ECU.

FIG. 7 is a flowchart showing an outline of the SMR disconnection process to be executed by the control ECU 300. The process in this flowchart is started when the power switch 90 is operated to stop the vehicle system and when the external charging of the battery 10 is terminated. Before the SMR disconnection process is started, the SMR 11 and the SMR 12 are in the connected state (ON), and the bidirectional charger 110 is in the activated state.

When the vehicle system is stopped and when the external charging is terminated, the SMR 12 is first switched from the connected state to the disconnected state in S20, and the process proceeds to S21. In S21, the bidirectional DC-DC converter 130 is operated to step down the voltage remaining between the power lines PL and NL and supply it to the auxiliary battery 140.

In S22, determination is made as to whether a third predetermined period has elapsed since the SMR 12 was switched to the disconnected state and the bidirectional DC-DC converter 130 was operated. The third predetermined period is a period in which the voltage VL reaches a voltage at which the failure or breakage of each device does not occur even if malfunction occurs due to an unintended short circuit, noise, or the like because the bidirectional charger 110 is in an unstable state. S22 is repeated until the third predetermined period elapses. When the third predetermined period has elapsed, positive determination is made and the process proceeds to S23.

In S23, the bidirectional charger 110 is stopped. The bidirectional charger 110 is stopped by turning OFF (disconnecting) the activation switch 66 of the drive circuit 60 of the bidirectional charger 110.

In S24, determination is made as to whether a fourth predetermined period has elapsed since the SMR 12 was switched to the disconnected state and the bidirectional DC-DC converter 130 was operated. The fourth predetermined period is a period in which the voltage VL reaches approximately 0 [V]. S24 is repeated until the fourth predetermined period elapses. When the fourth predetermined period has elapsed, positive determination is made and the process proceeds to S25. In S24, the positive determination may be made in response to detection that the voltage VL has reached approximately 0 [V] based on the output signal from the voltage sensor 91, and the process may proceed to S25.

In S25, the SMR 11 is switched to the disconnected state, and the current routine is terminated. The current routine may be terminated after the diagnosis process for determining whether an abnormality has occurred in the PCU 20, the bidirectional charger 110, the bidirectional DC-DC converter 130, or the like and the offset correction process (offset value learning process) for the voltage sensor 91 and the current sensor 92 are executed subsequently to S25 under the assumption that the voltage VL is 0 [V].

According to the second embodiment, the SMR disconnection process is started and the voltage VL decreases toward 0 [V] by the operation of the bidirectional DC-DC converter 130. The bidirectional charger 110 is stopped when the voltage is applied to the power lines PL and NL. When there is a possibility that a leak current is generated from the bidirectional charger 110 before the bidirectional charger 110 is stopped, that is, while the bidirectional charger 110 is activated, the voltage is applied to the power lines PL and NL. Therefore, even if the leak current is generated from the bidirectional charger 110, it is possible to suppress the increase in the voltage of the electric circuit including the PCU 20 due to the leak current. When the SMR 11 and the SMR 12 are disconnected and no voltage is applied to the power lines PL and NL, the bidirectional charger 110 is stopped. Therefore, it is possible to suppress the generation of the voltage in the electric circuit including the PCU 20 due to the leak current in the bidirectional charger 110.

When the bidirectional charger 110 is not activated, the bidirectional charger 110 is in an unstable state, and malfunction may occur due to an unintended short circuit, noise, or the like. According to the second embodiment, the bidirectional charger 110 is activated when the SMR 11 and the SMR 12 are in the connected state and the voltage of the battery 10 (battery voltage) is applied to the power lines PL and NL. Therefore, it is possible to suppress the short circuit or malfunction of the bidirectional charger 110 when a voltage is applied to the power lines PL and NL.

In the second embodiment, the SMR 11 may be disconnected (OFF) at the time t4, and the SMR 12 may be disconnected (OFF) at the time t5. The reason why the SMR 11 and the SMR 12 are disconnected at the different timings is to securely disconnect the SMR 11 and the SMR 12 (securely detect the disconnected state of the SMR 11 and the SMR 12). The SMR 11 and the SMR 12 may simultaneously be disconnected (OFF) at the time t4.

First Modification

Figure 8:
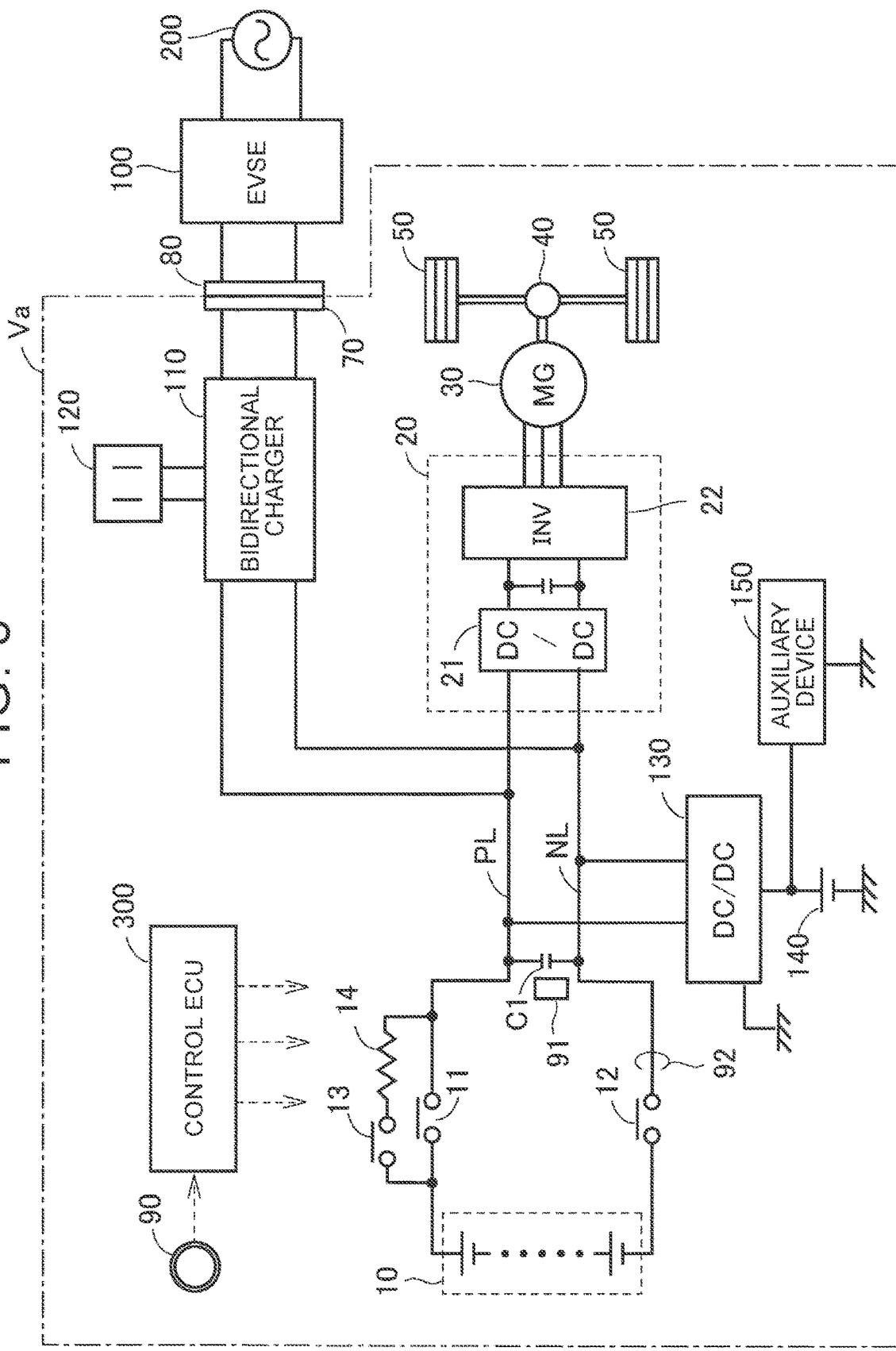
FIG. 8 is a diagram showing a configuration of an electrified vehicle according to a first modification.

FIG. 8 is a diagram showing a configuration of an electrified vehicle according to a first modification. An electrified vehicle Va of the first modification differs from the electrified vehicle V of the above embodiments only in terms of the configuration of the system main relays (SMRs). In FIG. 8, the electrified vehicle Va includes an SMR 13 in addition to the SMR 11 and the SMR 12. The SMR 13 is connected in parallel with the SMR 11 to connect or disconnect the positive electrode of the battery 10 and the power line PL. A limiting resistor 14 is connected in series with the SMR 13. In the first modification, the SMR 13 corresponds to a "first relay" of the present disclosure, the SMR 11 corresponds to a "second relay" of the present disclosure, and the SMR 12 corresponds to a "third relay" of the present disclosure.

FIG. 9 is a time chart illustrating an SMR connection process in the first modification. At a time t6, the SMR 11, the SMR 12, and the SMR 13 are in the disconnected state (OFF), and the battery 10 is not connected to the power lines PL and NL. Therefore, the voltage VL is 0 [V]. The activation signal for the bidirectional charger 110 is OFF, and the bidirectional charger 110 is in the stopped state.

When the power switch 90 is operated to activate the vehicle system or when the connector 80 of the EVSE 100 is connected to the inlet 70 to start charging the battery the SMR connection process is started at a time t7. When the SMR connection process is started at the time t7, the SMR 12 and the SMR 13 are switched to the connected state (ON). Since the limiting resistor 14 is connected in series with the SMR 13, the current flowing through the power line PL is limited, and a precharging process is performed to gradually increase the voltage VL. After a predetermined period has elapsed from the time t7, the activation signal for the bidirectional charger 110 is turned from OFF to ON, and the activation switch 66 of the drive circuit 60 is turned ON (connected), thereby activating the bidirectional charger 110. The predetermined period is a period in which the voltage VL increases by the precharging process and the voltage is securely applied between the power lines PL and NL. The predetermined period is preset by experiments or the like.

When the precharging period has ended, the SMR 13 is switched to the disconnected state (OFF) and the SMR 11 is switched to the connected state (ON) at a time t8. The precharging period may be predetermined by experiments or the like so that the voltage VL increases by precharging and a large current does not flow through the contacts of the SMRs when the SMRs are connected.

In the first modification as well, the bidirectional charger 110 is activated when a voltage is applied to the power lines PL and NL in the SMR connection process (during the precharging process). Thus, the same actions and effects as those in the first embodiment are attained.

Second Modification

In the second embodiment, the bidirectional DC-DC converter 130 steps down the voltage remaining between the power lines PL and NL and supplies it to the auxiliary battery 140 from the time t4 to the time t5 (FIG. 6) (FIG. 7: S21). When the SMR disconnection process is started at the time t4, the SMR 12 may be switched to the disconnected state (OFF) and a discharge resistor (discharge circuit) and the inverter 22 provided in the PCU 20 may be operated to cause the voltage VL to decrease over time. According to the second modification, the same actions and effects as those in the second embodiment are attained without operating the bidirectional DC-DC converter 130.

The electrified vehicle V of the above embodiments uses the bidirectional charger 110 to convert AC power supplied from the EVSE 100 into DC power and charge the battery 10, and to convert DC power of the battery 10 into AC power and output the AC power to the in-vehicle outlet 120. Instead of the bidirectional charger 110, the electrified vehicle may use a charger that does not have the function of outputting AC power to the in-vehicle outlet 120 (charger that only has the function of charging the battery 10).

The electrified vehicle V of the above embodiments uses the bidirectional charger 110 to convert AC power supplied from the EVSE 100 into DC power and charge the battery 10, and to convert DC power of the battery 10 into AC power and output the AC power to the in-vehicle outlet 120. Instead of the bidirectional charger 110, the electrified vehicle may include a converter that has the function of outputting AC power to the in-vehicle outlet 120 (converter that does not have the function of charging the battery 10). In this case, the electrified vehicle need not include the inlet 70.

In the above embodiments, the electrified vehicle is the battery electric vehicle (BEV) but may be any vehicle including a power storage device serving as a drive source, such as a plug-in hybrid electric vehicle (PHEV) or a hybrid electric vehicle (HEV). The electrified vehicle V may execute the SMR connection process of the first embodiment and the SMR disconnection process of the second embodiment. The electrified vehicle Va may execute the SMR connection process of the first modification and the SMR disconnection process of the second modification. Alternatively, the SMR connection processes and the SMR disconnection processes may be executed in combination as appropriate.

The embodiments disclosed herein shall be construed as illustrative and not restrictive in all respects. The scope of the present disclosure is shown by the claims rather than by the above description of the embodiments and is intended to include all modifications within the meaning and scope equivalent to those of the claims.

What is claimed is:

1. An electrified vehicle comprising:
   a power storage device;
   an electric motor configured to drive a drive wheel;
   a drive device configured to drive the electric motor by using electric power in the power storage device;
   relays configured to connect or disconnect the power storage device and the drive device;
   a converter connected to power lines between the relays and the drive device and configured to convert alternating current power supplied from an external power supply into direct current power and charge the power storage device; a control device configured to activate the converter or stop the converter when a voltage is applied to the power lines to which the converter is connected;
   an auxiliary battery configured to supply electric power to an auxiliary device; and
   a bidirectional direct current-to-direct current converter configured to transfer electric power between the auxiliary battery and the power lines, wherein
   the control device is configured to execute a connection process for switching each of the relays from a disconnected state to a connected state, and
   the connection process includes a process of stepping up the electric power in the auxiliary battery by the bidirectional direct current-to-direct current converter to increase the voltage on the power lines and activating the converter, and a process of switching the relays from the disconnected state to the connected state after the voltage on the power lines has increased to a predetermined value.

2. An electrified vehicle comprising:
   a power storage device;
   an electric motor configured to drive a drive wheel;
   a drive device configured to drive the electric motor by using electric power in the power storage device;
   relays configured to connect or disconnect the power storage device and the drive device;
   a converter connected to power lines between the relays and the drive device and configured to convert direct current power in the power storage device into alternating current power and output the alternating current power to an outlet;
   a control device configured to activate the converter or stop the converter when a voltage is applied to the power lines to which the converter is connected;
   an auxiliary battery configured to supply electric power to an auxiliary device; and
   a bidirectional direct current-to-direct current converter configured to transfer electric power between the auxiliary battery and the power lines, wherein
   the control device is configured to execute a connection process for switching each of the relays from a disconnected state to a connected state, and
   the connection process includes a process of stepping up the electric power in the auxiliary battery by the bidirectional direct current-to-direct current converter to increase the voltage on the power lines and activating the converter, and a process of switching the relays from the disconnected state to the connected state after the voltage on the power lines has increased to a predetermined value.

3. The electrified vehicle according to claim 1, wherein:
   the control device is configured to execute a disconnection process for switching each of the relays from the connected state to the disconnected state, and
   the disconnection process includes a process of, after the relays have been switched from the connected state to the disconnected state, supplying the electric power on the power lines to the auxiliary battery by the bidirectional direct current-to-direct current converter to step down the voltage on the power lines and stopping the converter.

4. The electrified vehicle according to claim 2, wherein: further comprising:
the control device is configured to execute a disconnection process for switching each of the relays from the connected state to the disconnected state, and
the disconnection process includes a process of, after the relays have been switched from the connected state to the disconnected state, supplying the electric power on the power lines to the auxiliary battery by the bidirectional direct current-to-direct current converter to step down the voltage on the power lines and stopping the converter.

* * * * *